United States Patent
Rethore et al.

(10) Patent No.: US 7,568,153 B2
(45) Date of Patent: Jul. 28, 2009

(54) METHODS AND COMPUTER SYSTEMS FOR DOCUMENT AUTHORING

(75) Inventors: Samuel Rethore, Valbonne (FR); Patrice Seurat, Grasse (FR); Axel Spiestersbach, Karlsruhe (DE); Cedric Ulmer, Marseilles (FR); Thomas Ziegert, Darmstadt (DE)

(73) Assignee: SAP AG, Walldorf (DE)

( * ) Notice: Subject to any disclaimer, the term of this patent is extended or adjusted under 35 U.S.C. 154(b) by 233 days.

(21) Appl. No.: 10/969,934

(22) Filed: Oct. 22, 2004

(65) Prior Publication Data

US 2005/0210381 A1  Sep. 22, 2005

(30) Foreign Application Priority Data

Oct. 24, 2003  (EP)  ................................. 03024356

(51) Int. Cl.
*G06F 7/08* (2006.01)
*G06F 17/27* (2006.01)

(52) U.S. Cl. ........................ 715/243; 715/202; 715/204; 715/205; 715/251

(58) Field of Classification Search ................. 715/525, 715/744, 513, 202, 204, 205, 238
See application file for complete search history.

(56) References Cited

U.S. PATENT DOCUMENTS

| 5,911,145 | A * | 6/1999 | Arora et al. | 715/514 |
| 6,148,311 | A * | 11/2000 | Wishnie et al. | 715/513 |
| 7,178,101 | B2 * | 2/2007 | Tunning | 715/236 |
| 2002/0103881 | A1 * | 8/2002 | Granade et al. | 709/218 |
| 2003/0237053 | A1 * | 12/2003 | Chen et al. | 715/514 |
| 2004/0027326 | A1 * | 2/2004 | Hays et al. | 345/106 |
| 2004/0103371 | A1 * | 5/2004 | Chen et al. | 715/513 |

FOREIGN PATENT DOCUMENTS

WO  WO 01/77822  10/2001

OTHER PUBLICATIONS

Rode, "PowerDesk 4.0", Published: Feb. 2001, Archive.org, pp. 1-4.*
Eisenstein et al, 'Applying Model-Based Techniques to the Development of UIs for Mobile Computers'), published: Jan. 2001, Publisher: ACM, pp. 69-76.*
Michael Yawn, "J2EE and JAX: Developing Web Applications and Web Services", published: Sep. 2002, pp. 8-9.*
M. Hori et al., "Annotation-based Web content transcoding," Computer Networks, Elsevier Science Publishers B.V., Amsterdam, NL, vol. 33, No. 1-6, Jun. 2000, pp. 197-211.
Hao-hua Chu et al., "Roam, a seamless application framework," Ubiquitous Computing, vol. 69, No. 3, Sep. 30, 2001, Atlanta, GA, pp. 209-226.
European Search Report dated Jun. 1, 2004.

* cited by examiner

*Primary Examiner*—Stephen S Hong
*Assistant Examiner*—Wilson Tsui
(74) *Attorney, Agent, or Firm*—Finnegan, Henderson, Farabow, Garrett & Dunner, LLP

(57) ABSTRACT

Methods and computer systems are provided for authoring documents. In one implementation, a computer system is provided that comprises an editor for editing a UI document, a pagination engine for paginating the UI document, and a pagination display for displaying a paginated document representation with respect to the UI document. The editor may be interfaced to the pagination engine so that the pagination engine paginates the user interface description document while being edited for a plurality of device categories. Further, the pagination engine may be interfaced to the pagination display so that the pagination display displays a paginated document representation for each device category with respect to the current editing status of the UI document.

15 Claims, 4 Drawing Sheets

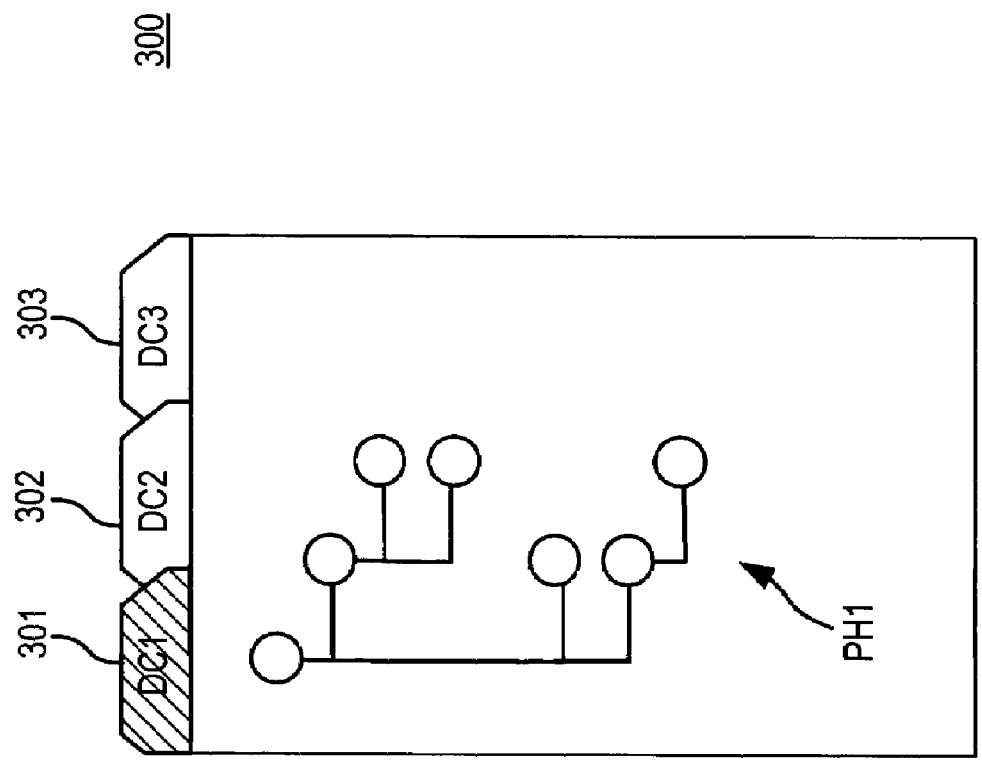

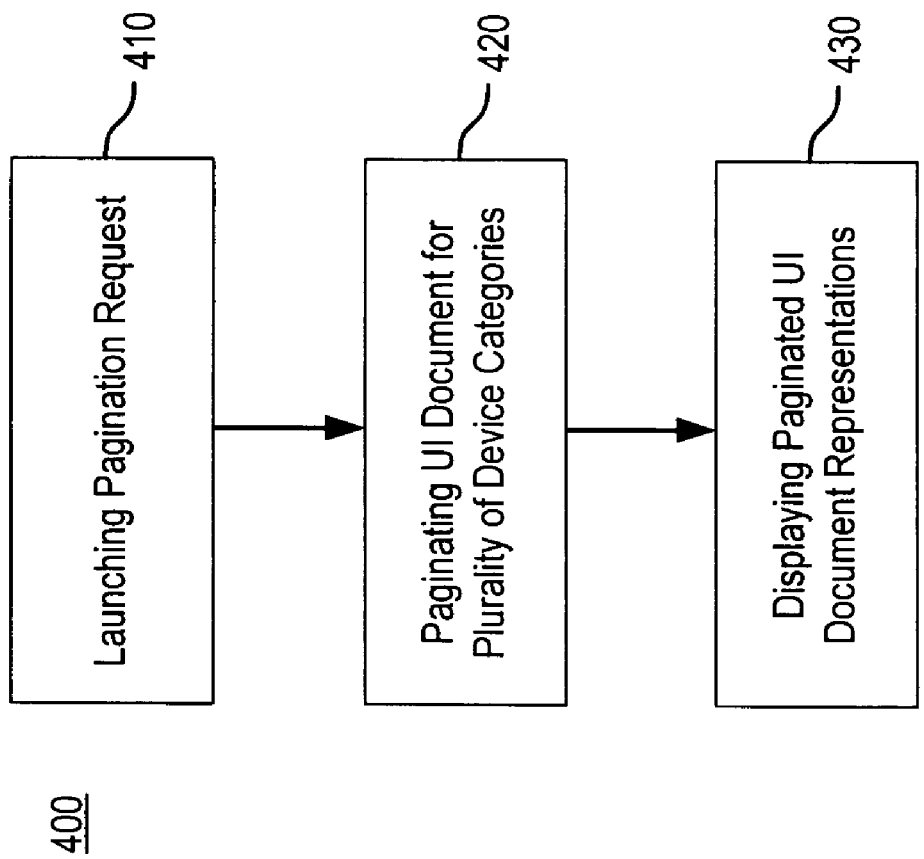

METHODS AND COMPUTER SYSTEMS FOR DOCUMENT AUTHORING

BACKGROUND

I. Field

The present invention generally relates to electronic data processing. More particularly, the present invention relates to methods, computer program products and systems for document authoring.

II. Background Information

Authoring tools for authoring user interface description documents are used to design user interfaces for software applications. The publication "Roam, A Seamless Application Framework", Journal of Systems and Software 2003, by Hao-hua Chu et al. describes specific aspects that need to be considered when designing an authoring tool for software applications running on a variety of computing devices, such as desktop computers or mobile devices. These devices can have different capabilities in processors, memory, networking, screen sizes, input methods, and software libraries. Depending on users' changing situations and environments, they may choose to switch from one type of device to another that brings the best combination of application functionality and device mobility (size, weight, etc.). Based on this scenario, the computer system proposed by the publication can be used to build multi-platform applications that can run on heterogeneous devices and allow a user to move/migrate a running application among heterogeneous devices in an effortless manner. The computer system is based on partitioning of an application into components and it automatically selects the most appropriate adaptation strategy at the component level for a target platform. The publication gives information on how a UI designer should design a user interface (UI), following the different abstract layers of the UI. Among them, there is the layout and task structure, which is linked to pagination and the fine graining of the pagination algorithm. Pagination is the fact of splitting a given document into several documents, which gathered output is the same content as the original document. The aim of pagination is mainly to keep a document usable on several types of devices, which may have very different display capabilities.

SUMMARY

A need has arisen for a computer system authoring tool that enables an improved UI with respect to various device categories.

Embodiments of the present invention provide methods and computer systems that enable an improved UI with respect to various device categories.

Embodiments of the present invention comprise methods and computer systems that use an automatic pagination algorithm to provide real time pagination results to a user who is editing a corresponding UI description document.

A computer system, according to one embodiment of the invention, comprises an editor that is interfaced to a pagination engine so that the pagination engine can paginate a UI description document while being edited for a plurality of device categories. Further, the pagination engine is interfaced to the pagination display so that the pagination display can display a paginated document representation for each device category with respect to the current editing status of the user interface description document.

Advantageously, a user who is using the computer system for developing software applications to be run on various device categories receives instantaneous feedback from the computer system about the number of pages required by the software application on the various device categories. Therefore, a computer system according to the present invention may provide a control tool that allows the user to monitor the various technical structures of the resulting user interface pages substantially simultaneously.

The aspects of the invention will be realized and attained by means of the elements and combinations particularly pointed out in the appended claims. Also, the described combination of the features of the invention is not to be considered as a limitation, and all the features can be combined in other arrangements without departing from the spirit of the invention. It is to be understood that both the foregoing general description and the following detailed description are exemplary and explanatory only and are not restrictive of the invention as described.

BRIEF DESCRIPTION OF THE DRAWINGS

The accompanying drawings, which are incorporated in and constitute a part of this disclosure, illustrate various embodiments and aspects of the present invention. In the drawings:

FIG. 3 is a second implementation of the pagination display; and

FIG. 4 is a flow chart of an exemplary method for authoring documents, according to an embodiment of the present invention.

DETAILED DESCRIPTION

Figure 1:
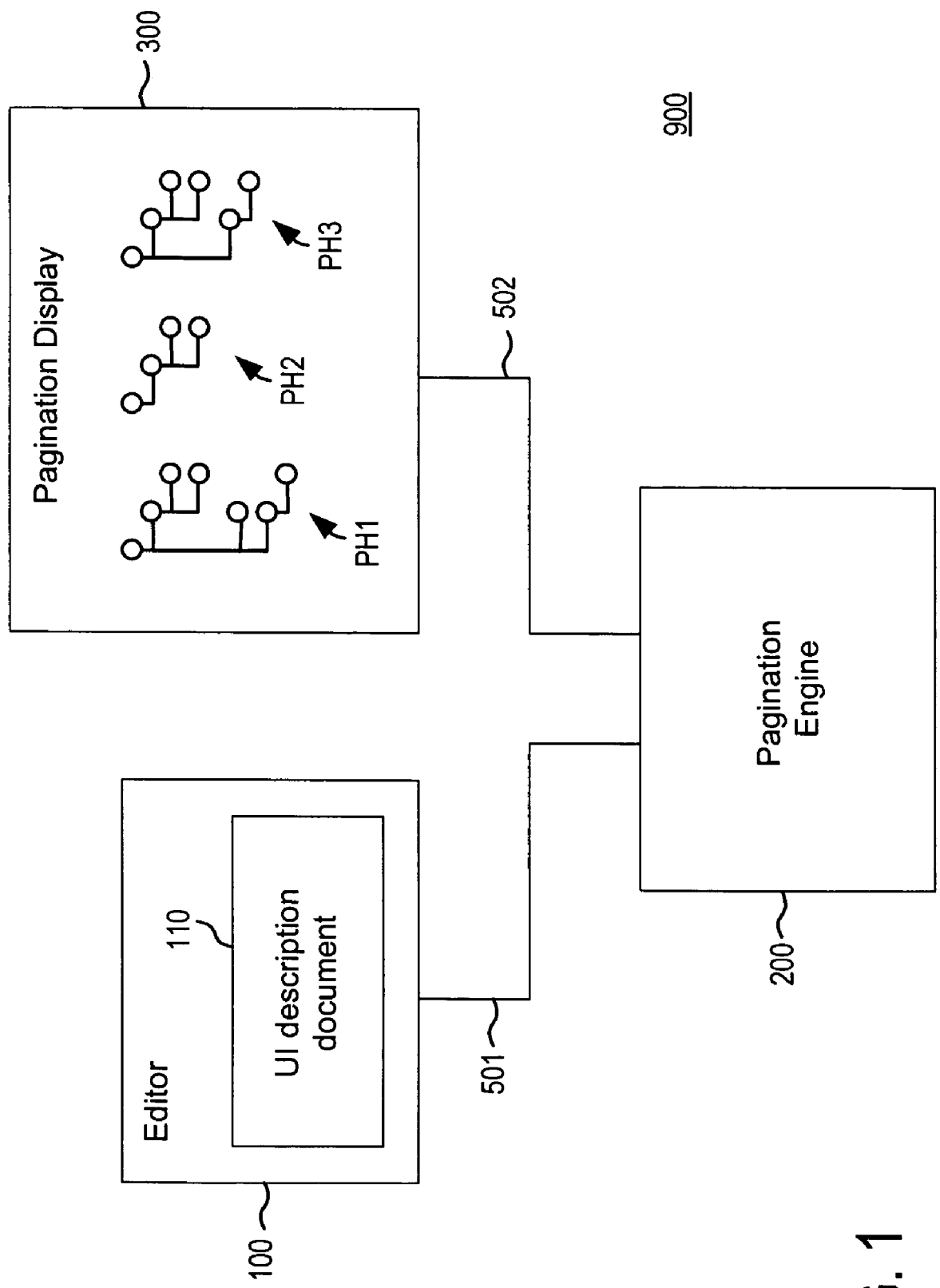
FIG. 1 is a block diagram of an exemplary computer system for authoring documents, according to an embodiment of the present invention.

FIG. 1 is a block diagram of an exemplary computer system 900 for authoring documents, consistent with an embodiment of the present invention. The computer system 900 includes an editor 100 for editing a user interface description document 110 (UI document) and a pagination engine 200 for paginating the UI document 110. It further includes a pagination display 300 for displaying a paginated document representation with respect to the UI document 110.

According to one embodiment, the UI document 110 comprises any document suitable to describe user interfaces for software applications. For example, UI document 110 may comprise structured documents written in a markup language, such as, for example, the Rule Identification Markup Language (RIML), the Extensible Markup Language (XML) or the Extensible HyperText Markup Language (XHTML).

According to one embodiment, editor 100 comprises a commercially available editor for editing documents, such as, for example, the editor that is used in Microsoft Frontpage or within the open source integrated development environment Eclipse.

The paginating engine 200, according to one embodiment, may be implemented similar to the Consensus Adaptation Engine as described on the Consensus web site (<http://www.consensus-online.org>) under the Project Acronym CONSENSUS, Project No. IST-2001-32407. Alternatively, paginating engine 200 may comprise a paginating engine similar to that described as part of the Structured Scalable Metaformats (SSM) technology developed by Hewlett Packard Laboratories.

The pagination display 300 can be implemented, for example, as a program window or a graphical display control embedded in a user interface of an integrated development environment that is used for the authoring of the UI document 110. According to one embodiment, the paginated document representation with respect to the UI document 110 reflects the technical structure of the UI document 110 in a page hierarchy PH1, PH2, PH3. The page hierarchy shows the number of pages in the document and which UI elements are arranged on a specific page.

According to the exemplary embodiment of FIG. 1, the editor 100 is interfaced 501 to the pagination engine 200 so that the pagination engine 200 can paginate the UI document (110) in real time for a plurality of device categories while being edited. For example, while editing the UI document 110, the user may request a pagination run by selecting an appropriate menu entry or button from the integrated development environment (IDE) that is used for the authoring.

According to the embodiment of FIG. 1, the IDE has knowledge of the plurality of device categories, such as, for example, desktop computers, laptop computers, personal digital assistants (PDA) or mobile phones. In one implementation, a device category is used to group multiple devices having similar capabilities in processors, memory, networking, screen sizes, input methods, and software libraries. In an alternative implementation, device categories are defined with a higher granularity, for example, resulting in a device category for each device. Typically, a user interface designed for a desktop computer is not appropriate to be displayed on a PDA because, for example, there may be a problem breaking down a large page of a desktop computer UI document into multiple pages of a corresponding PDA UI document. When breaking down a large page to multiple pages, the multiple pages should include at least the most important aspects covered by the large page and should be arranged so that the application can be executed on the PDA.

Figure 2:
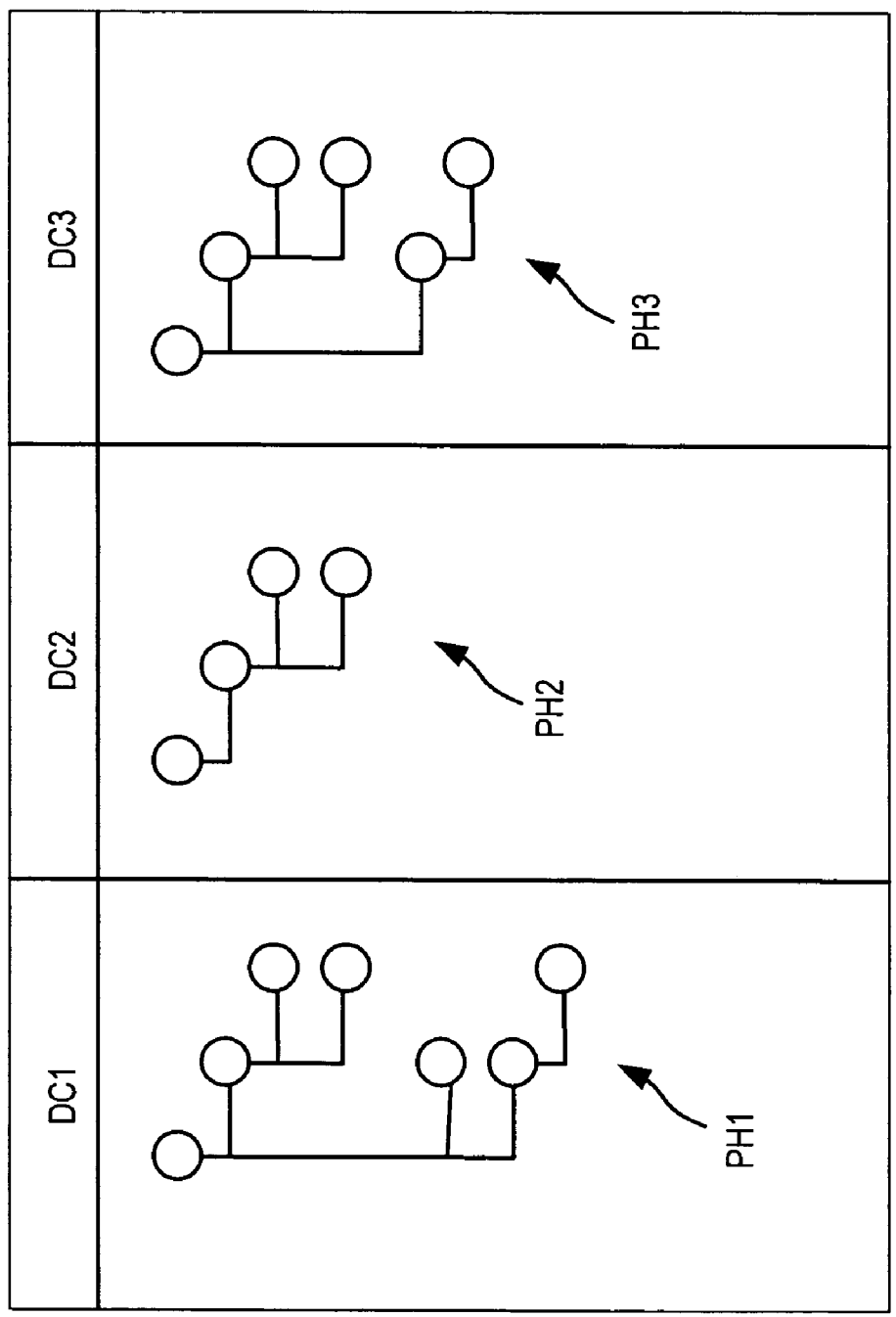
FIG. 2 is a first implementation of a pagination display.

Embodiments of the present invention may provide a user of an authoring computer system better control of the creation of a UI document that is suitable for multiple device categories by providing an adequate display of the real time paginating results with respect to the various device categories. For example, according to the embodiments of the present invention, the pagination engine 200 is interfaced 502 to the pagination display 300. The pagination display 300 can display the paginated UI document representations PH1, PH2, PH3 for each device category DC1, DC2, DC3 with respect to the current editing status of the UI document 110. FIGS. 2 and 3 illustrate two exemplary implementations of the pagination, where the pagination is performed for three different device categories. However, any number of device categories is possible.

Embodiments of the present invention may provide immediate access to device category dependent pagination results that correspond to the current editing status of the UI document 110. Therefore, the user can immediately identify if a problem exists in one or more technical structures relating to one or more device categories. Any problems can be fixed immediately for the affected device categories without significant impact on the pagination of other device categories. When device category dependent paginating is performed regularly while editing the UI document, possible problems, such as UI complexity problems, tend to occur in the most recently modified portion of the UI document. Therefore, dependencies of subsequent portions that might be negatively affected by problem fixing do not exist at that time. This is an advantage over paginating the whole UI document for the first time when it is completed and then starting to fix problems for the various device categories.

FIG. 2 is a first implementation of the pagination display 300. In the example of the first implementation, three page hierarchies PH1, PH2, PH3 are displayed next to each other. Each page hierarchy PH1, PH2, PH3 is a representation of the paginated UI document for the corresponding device category DC1, DC2, DC3. According to the implementation of FIG. 2, each page hierarchy PH1, PH2, PH3 is displayed in a corresponding column on the pagination display 300, where the corresponding column stands for the corresponding device category DC1, DC2, DC3.

In this exemplary implementation, the user gets an immediate overview of the pagination results for all device categories. According to one embodiment, the pagination engine 200 uses a rule set that is able to identify device category dependent problems. The document components causing the problem are marked (e.g., highlighted) in the page hierarchy for the corresponding device category.

FIG. 3 is a second implementation of the pagination display 300. The implementation of FIG. 3 is advantageous when, for example, the pagination of the UI document 110 is performed for more device categories than fit into the display area of pagination display 300. More specifically, the implementation of FIG. 2 may require scrolling to access hidden page hierarchies, whereas the implementation of FIG. 3 uses tabs for accessing the page hierarchies. According to the implementation of FIG. 3, the user can access each page hierarchy by selecting a tab 301, 302, 303 for the corresponding device category DC1, DC2, DC3. The second implementation requires less display area than the first implementation.

FIG. 4 is a flow chart of an exemplary method 400 for authoring documents, consistent with an embodiment of the present invention. The method comprises, at step 410, launching a pagination request. This may be done while editing a UI document 110. For example, according to one embodiment, the editor 100 launches the pagination request in response to a corresponding user action (e.g., selecting a corresponding menu entry in the editor or pushing a corresponding button).

The method may further comprise, at step 420, paginating the UI document 110 for a plurality of device categories DC1, DC2, DC3 (see FIG. 2). For example, in response to the pagination request, the pagination engine 200 uses a pagination algorithm that is able to perform paginating of the UI document for various device categories. The device categories are stored, for example, in a table structure or a file, in the computer system 900. Along with the device category specific limitations (e.g., display size, memory, etc.), the stored information serves as input parameters for the pagination algorithm.

Still further, the method of FIG. 4 may comprise, at step 430, displaying a paginated document representation PH1, PH2, PH3 for each device category DC1, DC2, DC3 with respect to the current editing status of the UI document 110. For example, the results of the pagination engine 200 can be presented to the user through the pagination display 300 (as shown in, for example in FIGS. 2 and 3) or in any other appropriate way giving the user better control of monitoring the technical structures of the device dependent document representations PH1, PH2, PH3.

Embodiments of the invention can be implemented in digital electronic circuitry, or in computer hardware, firmware, software, or in combinations thereof. According to one embodiment, the invention may comprise an authoring computer program product (i.e., a computer program) tangibly embodied in an information carrier (e.g., in a machine-readable storage device or in a propagated signal) for execution by, or to control the operation of a data processing apparatus (e.g., a programmable processor, a computer, or multiple computers). An authoring computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The typical elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example: semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

According to one embodiment, to provide for interaction with a user, embodiments of the invention may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present invention can also be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. According to embodiments of the present invention, the components of the system can be interconnected by any form or medium of digital data communication, e.g., a communication network. Examples of communication networks include a local area network (LAN) and a wide area network (WAN), e.g., the Internet.

According to one embodiment, a computing system consistent with the present invention includes clients and servers. A client and server are generally remote from each other and typically interact through a communication network. The relationship of client and server arises by virtue of computer programs running on the respective computers and having a client-server relationship to each other.

Other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims.

What is claimed is:

1. A system for authoring documents comprising:
   an editor for editing a user interface description document;
   a pagination engine, comprising a processor, for paginating the user interface description document for a plurality of device categories using an automatic real-time pagination algorithm that utilizes limitations associated with each device category to generate a plurality of page hierarchies of the user interface description document for the corresponding device categories to reflect the current editing status of the user interface description document, wherein paginating comprises splitting the user interface document into several pages, which gathered output is the same content as the original document; and
   a pagination display for displaying the plurality of page hierarchies to a user, wherein each page hierarchy comprises a graphical tree structure representation of the paginated user interface description document showing the number of pages in the user description document and the arrangement of user interface elements on one or more of the pages;
   wherein the editor is interfaced to the pagination engine so that the pagination engine paginates the user interface description document while being edited for a plurality of device categories; and further wherein the pagination engine is interfaced to the pagination display so that the pagination display displays a plurality of page hierarchies corresponding to the plurality of device categories with respect to the current editing status of the user interface description document.

2. The system of claim 1, wherein the plurality of page hierarchies are displayed in corresponding columns.

3. The system of claim 2, wherein the user interface description document comprises a markup language document.

4. The system of claim 1, wherein the plurality of page hierarchies are displayed through corresponding tabs.

5. The system of claim 4, wherein the user interface description document comprises a markup language document.

6. The system of claim 1, wherein the user interface description document comprises a markup language document.

7. A computer implemented method for authoring documents, the method comprising the steps of:
   launching a pagination request while editing a user interface description document;
   paginating, via a pagination engine, the user interface description document for a plurality of device categories using an automatic real-time pagination algorithm that utilizes limitations associated with each device category to generate a plurality of page hierarchies of the user interface description document for the corresponding device categories to reflect the current editing status of the user interface description document, wherein paginating comprises splitting the user interface document into several pages, which gathered output is the same content as the original document; and displaying, on a display device, the plurality of page hierarchies corresponding to the plurality of device categories to a user, wherein each page hierarchy comprises a graphical tree structure representation of the paginated user interface description document showing the number of pages in the user description document and the arrangement of user interface elements on one or more of the pages for each device category with respect to the current editing status of the user interface description document.

8. The method of claim 7, wherein the plurality of page hierarchies are displayed in corresponding columns of a pagination display.

9. The method of claim 7, wherein the plurality of page hierarchies are displayed and accessible through corresponding tabs.

10. The method of claim 7, wherein the user interface description document comprises a markup language document.

11. A computer program product comprising a computer-readable storage medium, the computer-readable storage medium comprising instructions for performing, when executed by a processor, a method for authoring documents, the method comprising:

launching a pagination request while editing a user interface description document;

paginating, via a pagination engine, the user interface description document for a plurality of device categories using an automatic real-time pagination algorithm that utilizes limitations associated with each device category to generate a plurality of page hierarchies of the user interface description document for the corresponding device categories to reflect the current editing status of the user interface description document, wherein paginating comprises splitting the user interface document into several pages, which gathered output is the same content as the original document; and displaying the plurality of page hierarchies corresponding to the plurality of device categories to a user, wherein each page hierarchy comprises a graphical tree structure representation of the paginated user interface description document showing the number of pages in the user description document and the arrangement of user interface elements on one or more of the pages for each device category with respect to the current editing status of the user interface description document.

12. The computer program product of claim 11, wherein the plurality of page hierarchies are displayed in corresponding columns of a pagination display.

13. The computer program product of claim 11, wherein the plurality of page hierarchies are displayed and accessible through corresponding tabs.

14. The computer program product of claim 11, wherein the user interface description document comprises a markup language document.

15. A system for authoring documents comprising:

means for launching a pagination request while editing a user interface description document;

means for pagination, using a pagination engine comprising a processor, for paginating the user interface description document for a plurality of device categories using an automatic real-time pagination algorithm that utilizes limitations associated with each device category to generate a plurality of page hierarchies of the user interface description document for the corresponding device categories to reflect the current editing status of the user interface description document, wherein paginating comprises splitting the user interface document into several pages, which gathered output is the same content as the original document; and means for displaying the plurality of page hierarchies corresponding to the plurality of device categories to a user, wherein each page hierarchy comprises a graphical tree structure representation of the paginated user interface description document showing the number of pages in the user description document and the arrangement of user interface elements one or more of the pages for each device category with respect to the current editing status of the user interface description document.

* * * * *